United States Patent
Suvorov (10) Patent No.: US 10,043,138 B2
(45) Date of Patent: Aug. 7, 2018

(54) METADATA REPRESENTATION AND STORAGE

(71) Applicant: EMC Corporation, Hopkinton, MA (US)

(72) Inventor: Vladimir Alexandrovich Suvorov, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 14/869,074

(22) Filed: Sep. 29, 2015

(65) Prior Publication Data

US 2016/0350323 A1 Dec. 1, 2016

(30) Foreign Application Priority Data

Mar. 26, 2015 (RU) ................................ 2015111013

(51) Int. Cl.
*G06F 17/00* (2006.01)
*G06F 17/30* (2006.01)
*G06N 99/00* (2010.01)

(52) U.S. Cl.
CPC ........ *G06N 99/005* (2013.01); *G06F 17/3012* (2013.01)

(58) Field of Classification Search
CPC ........................... G06F 17/3012; G06N 99/005
See application file for complete search history.

(56) References Cited

U.S. PATENT DOCUMENTS

2005/0160110 A1* 7/2005 Charlet ............ G06F 17/30595
2016/0188710 A1* 6/2016 Dulba Naik .......... G06F 17/303
707/737

OTHER PUBLICATIONS

Wikipedia, "Document-Oriented Database," http://en.wikipedia.org/w/index.php?title=Document-oriented_database&printable=yes, Jan. 24, 2015, 6 pages.
Pivotal Docs, "HAWQ Overview," http://pivotalhd.docs.pivotal.io/doc/2010/HAWQOverview.html, Jan. 28, 2015, 5 pages.
MongoDB, "Introduction to MongoDB," https://www.mongodb.org/about/introduction, 2015, 3 pages.
Center for Statistical Genetics, "SAM-Genome Analysis Wiki," http://genome.sph.umich.edu/wiki/SAM, Sep. 11, 2015, 4 pages.
The SAM/BAM Format Specification Working Group, "Sequence Alignment/Map Format Specification," https://samtools.github.io/hts-specs/SAMv1.pdf, Aug. 28, 2015, 16 pages.

* cited by examiner

*Primary Examiner* — Cheryl Lewis
(74) *Attorney, Agent, or Firm* — Ryan, Mason & Lewis, LLP (57) ABSTRACT

At least one original data set is obtained. Header type metadata is extracted from the original data set and the extracted header type metadata is stored in a document-oriented database. Content type metadata is extracted from the original data set and the extracted content type metadata is stored in a table-structured database. The original data set is stored in a data store. The document-oriented database comprises one or more links to access the content type metadata in the table-structured database and the original data set in the data store. By way of example only, the data storage techniques may be used for bioinformatics applications.

20 Claims, 4 Drawing Sheets

```
@HD   VN:1.0  SO:coordinate
@SQ   SN:1   LN:249250621    AS:NCBI37
      UR:file:/data/local/ref/GATK/human_glk_v37.fasta
      M5:1b22b98cdeb4a9304cb5d48026a85128
@SQ   SN:2   LN:243199373    AS:NCBI37
      UR:file:/data/local/ref/GATK/human_glk_v37.fasta
      M5:a0d9851da00400dec1098a9255ac712e
@SQ   SN: 3  LN: 198022430   AS:NCBI37
      UR:file:/data/local/ref/GATK/human_glk_v37.fasta
      M5:fdfd811849cc2fadebc929bb925902e5
@RG   ID:UM0098:1   PL:ILLUMINA   PU:HWUSI-EAS1707-615LHAAXX-L001
@RG   ID:UM0098:2   PL:ILLUMINA   PU:HWUSI-EAS1707-615LHAAXX-L002
@PG   ID:bwa  VN:0.5.4
@PG   ID:GATK TableRecalibration   VN:1.0.3471
      CL:Covariates=[ReadGroupCovariate, QualityScoreCovariate,
CycleCovariate, DinucCovariate, TileCovariate],
default_read_group=null, default_platform=null, force_read_group=null,
force_platform=null, solid_recal_mode=SET_Q_ZERO, window_size_nqs=5,
homopolymer_nback=7, exception_if_no_tile=false,
ignore nocall colorspace=false, pQ=5, maxQ=40, smoothing=1
```

FIG. 4

```
97:R:-272+13K17D24M     113  1  497    37  37M     15  100338662  0     CGGGTCTCGACTTGAGGAGAACTGTGTCCGCCTTCAG    0;:==                SEQ ID NO. 1
20S89:F:275+18M2D19M     99  1  17644   0  37M      =  17919    314    TATGACTGCTAATAATACCTACACATGTTAGAACCAT    >>>>>>>>>>>         SEQ ID NO. 2
20389:F:275+18M2D19M    147  1  17919   0  18M2D19M  =  17644   -314   GTAGTACCAACTGTAAGTCCTTATCTTCATACTTTGT    ;449
1597+10M2I25M:R:-209    83  1  21678   0  8M2I27M   =  21469   -244   CACCACATCACATATACCAAGCCTGGCTGTGTCTTCT    <;9<<5><<<>          SEQ ID NO. 4
                                                                                                                            SEQ ID NO. 3
```

*FIG. 5*

SEQUENCE LISTING

<160> NUMBER OF SEQ ID NOS: 4

<210> SEQ ID NO 1
<211> LENGTH: 37
<212> TYPE: DNA
<213> ORGANISM: Artificial Sequence
<220> FEATURE:
<223> OTHER INFORMATION: Example of a DNA Sequence

<400> SEQUENCE: 1
cgggtctgac ctgaggagaa ctgtgctccg ccttcag                    37

<210> SEQ ID NO 2
<211> LENGTH: 37
<212> TYPE: DNA
<213> ORGANISM: Artificial Sequence
<220> FEATURE:
<223> OTHER INFORMATION: Example of a DNA sequence

<400> SEQUENCE: 2
tatgactgct aataatacct acacatgtta gaaccat                    37

<210> SEQ ID NO 3
<211> LENGTH: 37
<212> TYPE: DNA
<213> ORGANISM: Artificial Sequence
<220> FEATURE:
<223> OTHER INFORMATION: Example of a DNA sequence

<400> SEQUENCE: 3
gtagtaccaa ctgtaagtcc ttatcttcat actttgt                    37

<210> SEQ ID NO 4
<211> LENGTH: 37
<212> TYPE: DNA
<213> ORGANISM: Artificial Sequence
<220> FEATURE:
<223> OTHER INFORMATION: Example of a DNA sequence

<400> SEQUENCE: 4
caccacatca catataccaa gcctggctgt gtcttct                    37

METADATA REPRESENTATION AND STORAGE

FIELD

The field relates generally to data storage environments, and more particularly to improved metadata representation and storage in such environments.

REFERENCE TO SEQUENCE LISTING

The Sequence Listing in ASCII electronic format submitted electronically via EFS-web is incorporated herein by reference in its entirety. The Sequence listing file, entitled EMC_14_0999_SEQ_ASCII.txt, was created on Nov. 30, 2015 and is 1012 bytes in size.

BACKGROUND

The handling of data has become extremely important given today's increased demand for, and usage of, data in just about every aspect of society including, but not limited to, business, social, technology, research, etc. Data handling issues include, by way of example only, data variety (heterogeneity), data volume, and data velocity. Adding to the challenge is the fact that data may also be geographically distributed and/or stored in different ways and in different formats in different file or object stores. Thus, a main challenge that has emerged in data storage environments is attempting to unify data query interfaces and building up searchable data catalogues. Typical approaches to this challenge are to build up a metadata catalogue or store original data itself in some form of a database. As used in this context, "metadata" refers to data about the original data.

For example, with regard to bioinformatics data, existing solutions offer either manual tagging of the original data with a relational metadata database or processing and storing the original data in the relational tables. As is known, "bioinformatics" is an interdisciplinary field that develops methods and software tools for understanding biological data.

SUMMARY

Embodiments of the invention provide techniques for improved metadata representation and storage in data storage environments.

For example, in one embodiment, a method comprises the following steps. At least one original data set is obtained. Header type metadata is extracted from the original data set and the extracted header type metadata is stored in a document-oriented database. Content type metadata is extracted from the original data set and the extracted content type metadata is stored in a table-structured database. The original data set is stored in a data store. The document-oriented database comprises one or more links to access the content type metadata in the table-structured database and the original data set in the data store.

Advantageously, illustrative embodiments provide a hybrid model of metadata combining flexible type schemas with a document-oriented metadata store (storing header metadata) and table-structured metadata store (storing content metadata). The original data is stored separately and is linked to the document-oriented metadata store. Also, an automatic metadata extraction feature is implemented to overcome the drawbacks of the typical manual annotation. This hybrid approach benefits flexibility and performance compared to a single metadata repository approach. By way of example only, the data storage techniques may be used for bioinformatics applications.

These and other features and advantages of the invention will become more readily apparent from the accompanying drawings and the following detailed description.

DETAILED DESCRIPTION

Illustrative embodiments may be described herein with reference to exemplary cloud infrastructure, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data center," "data processing system," "computing system," "data storage system," and the like as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, "metadata" generally refers to data about other data, for example, data that describes or defines other data. In a context as illustratively used herein, metadata is extracted from some original data (e.g., a data object or data file, or more generally a data set). In a bioinformatics data example, a data object or data file (original data) can be a large stream or sequence of bases A, T, C, G (e.g., on the order of $10^9$ bases in a large sequence). In illustrative embodiments, metadata extracted from the original data is in the form of header metadata and content metadata, as will be further explained herein.

Traditionally, data is stored in files, and files reside on a file system. A file system contains a file directory which stores file names and usually some system information (e.g., creation date, etc.). A search and file catalogue for such a system is typically organized based on this system information (e.g., search by file name). There are also full text search engines that allow indexing the content.

A next level of sophistication involves adding metadata to the data so that some content aware engine may be employed. These engines may use flexible or fixed data schemas or no schemas at all. As an option, fixed data schema may be extended with user-defined fields. For example, for bioinformatics data, examples of a fixed data schema include, but are not limited to, the Global Alliance for Genomics and Health (GA4GH) standard or the Health Level 7 (HL7) genomics schema. Fixed data schemas usually utilize a table structure since schemas are known in advance and indexes on tables provide good search performance. Also, foreign keys may be utilized to validate the schema easier.

If user defined information is added it usually resides in a separate table with an id-property-value schema. User defined information represented in this manner usually lacks in search performance for complex queries.

In a flexible data schema approach, a user defines a schema and then defines a document falling under the schema. Then, the user performs manual annotation of the data.

In some cases, no schema/tagging is presented, i.e., a user simply tags the object and typically a key-value database is used.

Illustrative embodiments of the invention overcome drawbacks associated with existing approaches by providing a hybrid metadata storage system that comprises a document-oriented database for "header" type metadata, a table-structured database for "content" type metadata, a file and/or object store (repository) for the original data, and a mechanism that performs automatic metadata extraction.

A file typically has a header and content. It is realized herein that, for bioinformatics, both file headers and content contain valuable information that can be represented as metadata and indexed to provide better search mechanisms. Also bioinformatics data files often are large (e.g., 100 GB file is normal) and full-text engines are not very efficient. Extracting metadata from the file helps for analytics and random access, when only part of the file is needed. Headers typically contain descriptive information, e.g., information about the biological sample, when it was produced, what sequencing machine produced it, etc.

Also it is realized herein that headers may significantly vary, depending on the file format version and machine that produced the file, while content is usually more or less stable in terms of format.

Accordingly, illustrative embodiments store header metadata in a flexible document-oriented database and content metadata in a table-structured database (e.g., NoSQL database, where NoSQL stands for "not only" Structured Query Language), with autogenerating table schemas for the latter. The original data itself is also stored and is accessible through a network file system (NFS) or an object (S3) link.

By way of example only, one of the methods of autogeneration comprises the following steps. An object is linked to a particular object type, for example, "alignment data" or "raw reads data". Those object types have schemas as they are defined within an interface description language IDL (e.g., AVRO IDL). This linkage may be done explicitly by specifying parser parameters or by a machine learning algorithm. Schemas are defined also as objects and may be either imported explicitly or learned through machine learning algorithms. Data tables are directly linked with schemas and are handled by scripts that can issue requests to create tables according to the schemas. This method compares only table data within one table but, as there is much less variability in the table part, we gain an advantage to compare different versions of similar data formats and different formats of data of similar origin, e.g., data from SOAP aligner (Short Oligonucleotide Analysis Package), BWA Burrows-Wheeler alignment), Bowtie, which are different programs for alignment.

Advantageously, each part of the data/metadata is stored and indexed in an optimal way. The header metadata database is relatively lightweight and does not store large objects, so its performance is optimal. The content metadata database is much larger, better structured, indexed, and may run SQL (as well as other) queries. The original data itself is independently accessible "as-is" through the link in the header database. That is, in illustrative embodiments, the core metadata database is the header document-oriented database that contains link(s) to the original data and identifier(s) of records of an object in the content metadata database.

Figure 1:
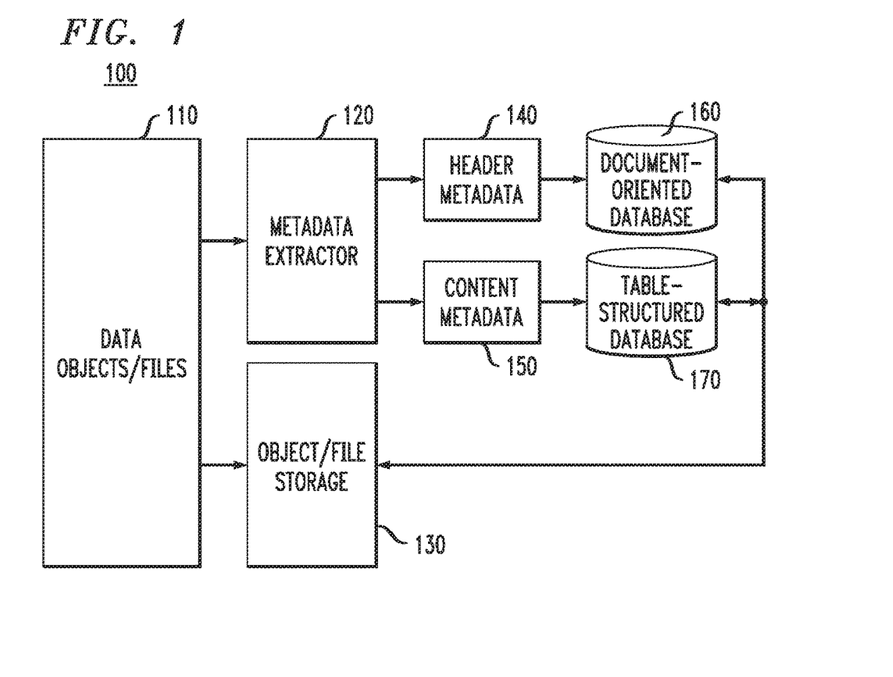
FIG. 1 illustrates a data storage system according to an embodiment of the invention.

FIG. 1 illustrates a data storage system according to an embodiment of the invention. As shown, data storage system 100 comprises one or more data objects (data files) 110, a metadata extractor 120, a data object/file storage 130, header metadata 140, content metadata 150, a document-oriented database 160, and a table-structured database 170. In one illustrative embodiment, the document-oriented database 160 may be implemented via the Mongo database (commercially available from MongoDB, Inc. of Palo Alto, Calif.), while the table-structured database 170 may be implemented via the Pivotal HD/HAWQ database (commercially available from Pivotal Software, Inc. of Palo Alto, Calif.).

Figure 2:
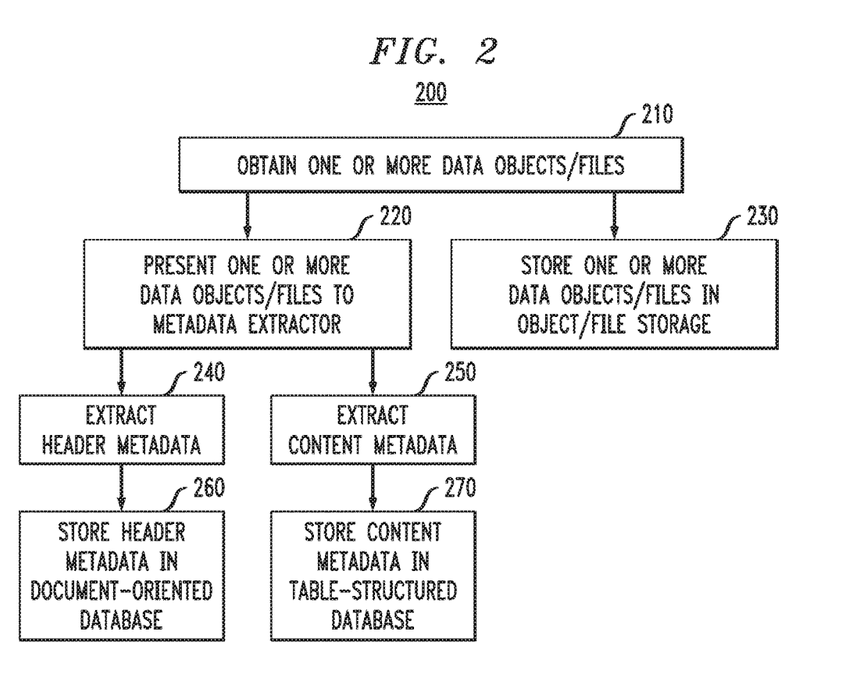
FIG. 2 illustrates a data storage methodology according to an embodiment of the invention.

FIG. 2 illustrates a data storage methodology 200 implemented by data storage system 100. In step 210, the data storage system 100 obtains one or more data objects/files (e.g., at least one original data set). As mentioned above, in a bioinformatics data example, a data object or data file (original data) can be a large stream or sequence of bases A, T, C, G (e.g., on the order of $10^9$ bases in a large sequence). It is to be understood, however, that embodiments of the invention are not intended to be limited to a bioinformatics domain but rather are more generally applicable to any type of data domains. By way of further example only, embodiments may be implemented in an electrical-energy type data domain, metal mining type data domain, etc.

In the context of the bioinformatics example, it is understood that the original data file typically contains header metadata (header type data from the original data file that describes, defines and/or characterizes the original data file or parts thereof) and content metadata (content type data that also describes, defines and/or characterizes the original data file or parts thereof).

The header metadata may include, but is not limited to, one or more of: data identifying the particular machine, instrument and/or software program (mechanism) used to obtain the biological data in the original data file; data identifying the one or more biological species from which the biological data in the original data file was taken; the file name of the original data file; and the creation and/or modification date of the original data file. This header information is typically part of the original data object/file 110 that is obtained by the data storage system 100, and may, for example, be unstructured or semi-structured.

The content metadata may include, but is not limited to, one or more reads that are generated by a deoxyribonucleic acid (DNA) sequencing machine. As is known in bioinformatics, "reads" are generated when a larger DNA sequence is analyzed by an automated DNA sequencing machine. The sequencing machine reads the order of DNA bases (A, T, C, G) associated with smaller sequences that are part of the overall larger input sequence, and stores this information in computer memory. These reads are typically stored in a table format (i.e., structured). Reads are therefore portions of content of the overall larger DNA sequence being analyzed, and therefore are considered an example of content metadata in accordance with illustrative embodiments. Another example of content metadata may include, but is not limited to, one or more variants of sequences in the overall larger DNA sequence. As is known in bioinformatics, "variants" are sequences that result from mapping actual sequences (from the overall larger DNA sequence) against a reference genome. These variants are typically stored in a table format. Reads and variants may be part of the original data object/file 110 that is obtained by the data storage system 100, or they may be generated after the overall larger sequence is obtained by the system.

Returning to methodology 200 in FIG. 2, the one or more data objects/files 110 are presented to metadata extractor 120 in step 220 and also stored "as-is" in object/file storage (repository) 130 in step 230. The object/file store 130 may, for example, utilize a network file system (NFS) or an object (S3) link, depending on the format in which the original data is obtained.

The metadata extractor 120 extracts the header metadata 140 in step 240 and the content metadata 150 in step 250, non-limiting examples of which are described above.

In step 260, the header metadata 140 is stored in the document-oriented database 160.

In step 270, the content metadata 150 is stored in the table-structured database 170.

In one embodiment, metadata extractor 120 comprises a parser that is configured to read data formats, decompress the metadata, and separate the metadata into header metadata and content metadata. A data division mechanism may be user-defined but, in one example, the division is made based on the size of the resulting metadata, e.g., header metadata may be less than a megabyte. Then, after the data is divided, the parser can automatically extract the two metadata types and send them to their respective database (160 or 170). Also, if a user wants to add metadata, the user may do so. By way of one example only, a user may add tags to the header metadata stored in database 160.

Thus, the parser (of metadata extractor 120) defines the format (schema). The parser may also use an existing format. This may be decided as different data is compared. Schemas are for information only, comparable to hints to search engine. If parsers parse differently, the system may not be able to compare; but embodiments are not limited to fixed schema, and thus if specific data is available then a parser without any schema may be created. The parser may take the schema as an input just to validate against it. Also, the parser may create some IDL schema for table metadata and the table will be created if it is not yet present.

Furthermore, the parser may be configured to turn the data into a JavaScript Object Notation (JSON) object that is placed into the document-oriented database 160. This can be done similar to a Document Object Model (DOM) for websites, where browsers are able to parse it and show a website based on it. Schemas here are needed only to inform a user that he has certain fields, so that he can handle them somehow. For example, if object1 has a field "sample" and object2 has a field "sample" then a query on the field "sample" will involve both objects even if they have other different data. But for a user to be informed about this field, we introduce schemas and also introduce validation against schemas so a user should expect certain fields in certain objects (e.g., interfaces in object oriented programming or OOP).

Advantageously, the document-oriented structure of the header database 160 allows multiple formats and versions to be merged while searching based on the metadata structure. Also, this type of database does not require defining a schema in advance, but rather a schema is defined in the process of parsing (as explained above), thus resulting in a very flexible structure when the metadata schema is used only for informing the user about possible query patterns.

Furthermore, the table-structured database 170 for the content metadata can utilize so-called "big data" technologies to ensure best performance and is configured to run SQL queries that allow a fast and robust search. Also, storing content metadata as described herein has benefits for analytics, since the data is already normalized.

Still further, storing the original data 110 intact in object/file storage 130 has a benefit in performance when a user wants to access the data object, since no manipulation is required to return the object. Also, storing the original data in this manner has benefits for eliminating parser errors and is also beneficial for compliance to security standards.

Accordingly, data storage system 100 provides a very flexible approach whereby improved data management performance can be achieved. Data storage system 100 provides a hybrid metadata storage environment that contains document-oriented data storage for header type data, table-structured storage for content type data, a file and/or object repository, and a mechanism that allows automatic metadata extraction. The system utilizes the nature of the data it is processing to split, store, extract and query metadata in an optimal way.

Also, in illustrative embodiments, the core metadata database is the header document-oriented database 160 that contains link(s) to the original data stored in storage 130 and identifier(s) of records of an object in the content metadata database 170. In one illustrative embodiment, this linking is accomplished by the document-oriented database having an object identifier (id) and: a link to storage (e.g., //nfs/mydata/file1 or a world wide web uniform resource link such as mysite.com/objects/object1) or bucket id and object id for storage 130; and locator to table name for content metadata database 170. A NoSQL table database has those ids as one of the column fields, so for each record, we have an object id for the metadata database.

Figure 3:
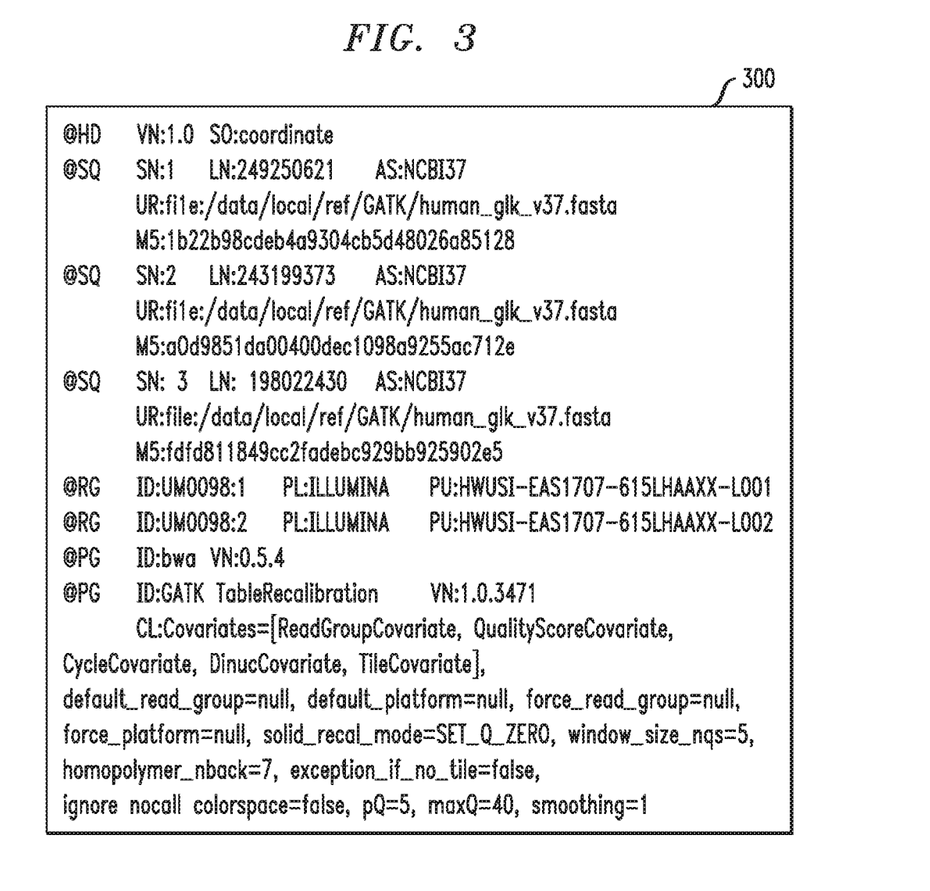
FIG. 3 illustrates an example of a source of header metadata according to an embodiment of the invention.

FIG. 3 illustrates an example of header information (SAM headers) from which header metadata is extracted according to an embodiment of the invention. A BAM file represents a compressed SAM file which contains a genome alignment to some reference. SAM refers to a sequence alignment map and a BAM file is a binary version of a SAM file. The BAM file has headers which store data about the sample and reference the sample was aligned against. These headers as shown in BAM file 300 in FIG. 3 are examples of headers from which header metadata 140 is extracted. See, e.g., the following http links: //genome.sph.umich.edu/wiki/SAM and //samtools.github.io/hts-specs/SAMv1.pdf for further examples.

Figure 4:
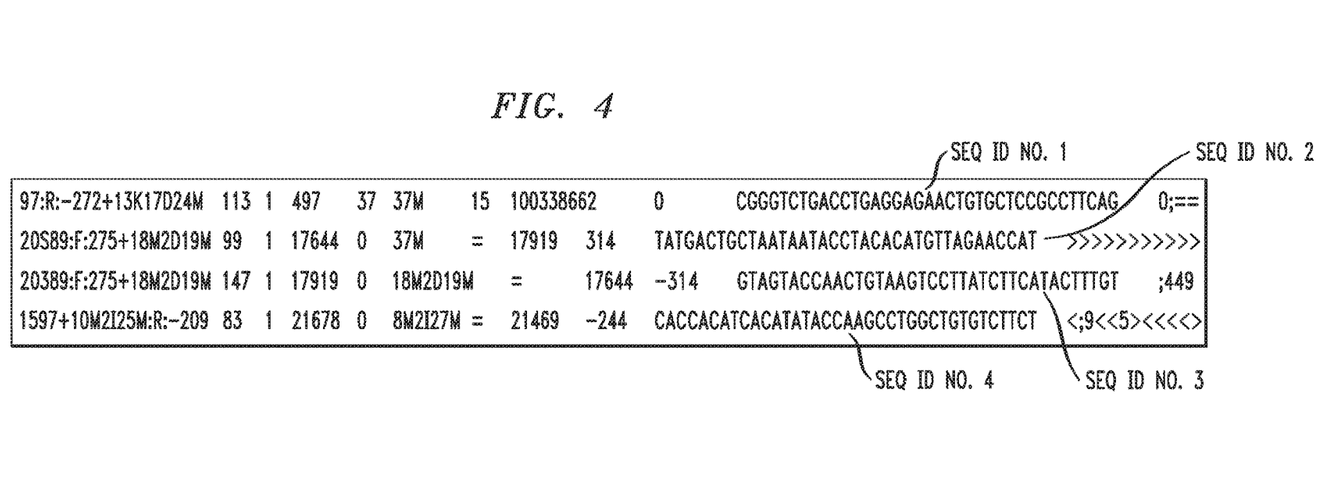
FIG. 4 illustrates an example of a source of content metadata according to an embodiment of the invention.

Also a SAM file contains alignments of reads to the reference, as shown in SAM file 400 in FIG. 4. The alignments section stores alignment position, the read itself, the read quality, the alignment string with matches/mismatches, and other parameters. These reads are examples of content metadata 150. Shown in FIG. 4 are four reads (usually there are millions of reads), SEQ ID NO. 1, SEQ ID NO. 2, SEQ ID NO. 3 and SEQ ID NO. 4. This is a tab-delimited text file. Each line is a "table" row. BAM is simply compressed SAM, so a parser (as part of metadata extractor 120) transforms BAM into SAM (e.g., using SAMtools library), extracts metadata, and stores the metadata as explained herein.

Thus, in one illustrative embodiment, the metadata extractor 120 uses SAMtools software to unpack the SAM file from the BAM file and parses the data. Header data about the sample and the reference go into the header metadata database 160 (which, in one example, is MongoDB) and content alignment data after extraction goes into the content table-structured database 170 (which, in one example, is Pivotal HAWQ). The original data itself (data object/file 110) may be stored in an object-oriented S3 compatible interface such as is available in a EMC ViPR storage database (EMC Corporation of Hopkinton, Mass.).

Figure 5:
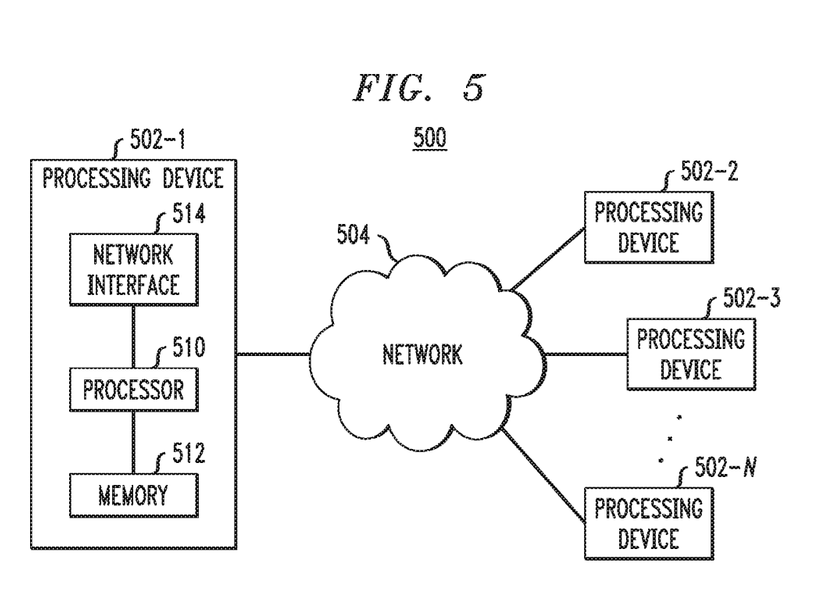
FIG. 5 illustrates a processing platform used to implement a data storage system according to an embodiment of the invention.

As an example of a processing platform on which a data storage system (e.g., 100 in FIG. 1) may be implemented is processing platform 500 shown in FIG. 5. The processing platform 500 in this embodiment comprises a plurality of processing devices, denoted 502-1, 502-2, 502-3, . . . 502-N, which communicate with one another over a network 504. It is to be appreciated that the metadata storage and usage methodologies described herein may be executed in one such processing device 502, or executed in a distributed manner across two or more such processing devices 502. The data storage system may be implemented in a cloud infrastructure environment which may also be executed in a distributed manner across two or more such processing devices 502. The metadata storage functionality described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the data storage system shown as 100 in FIG. 1 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. As such, the data management techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 500 in one or more embodiments of the invention is the VMware vSphere (VMware Inc. of Palo Alto, Calif.) which may have an associated virtual infrastructure management system such as the VMware vCenter. The underlying physical infrastructure may comprise one or more distributed processing platforms that include storage products such as VNX and Symmetrix VMAX (both available from EMC Corporation of Hopkinton, Mass.). A variety of other computing and storage products may be utilized to implement the one or more cloud services that provide the functionality and features described herein.

It was noted above that portions of the system 100 may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

---

What is claimed is:

1. A method comprising:
obtaining at least one original data set;
extracting header type metadata from the original data set and storing the extracted header type metadata in a document-oriented database implemented on a first processing element, wherein the header type metadata comprises identifying data associated with the original data set;
extracting content type metadata from the original data set and storing the extracted content type metadata in a table-structured database implemented on a second processing element, wherein the content type metadata comprises one or more sets of data generated by analysis of the original data set, and wherein the first processing element is operatively coupled to the second processing element via a communication network;
storing the original data set in a data store implemented on a third processing device, wherein the first processing element and the second processing element are operatively coupled to the third processing element via the communication network;
wherein the document-oriented database comprises one or more links to access the content type metadata in the table-structured database and the original data set in the data store via the communication network operatively coupling the first processing element, the second processing element, and the third processing element;
receiving a query to access one or more of at least a portion of the original data set, at least a portion of the header type metadata, and at least a portion of the content type metadata; and
processing the query through the document-oriented database and accessing the content type metadata in the table-structured database and the original data set in the data store using the one or more links from the document-oriented database.

2. The method of claim 1, wherein one or more of the extracting steps comprises a parser configured to automatically determine a schema associated with the extracted metadata.

3. The method of claim 2, wherein the schema is automatically determined by the parser by importing a schema.

4. The method of claim 2, wherein the schema is automatically determined by the parser by applying a machine learning algorithm.

5. The method of claim 2, wherein the parser is configured to read data formats associated with the original data set, decompress metadata associated with the original data set, and separate the metadata into the header type metadata and the content type metadata.

6. The method of claim 1, wherein the header type metadata is stored in the document-oriented database as one or more objects.

7. The method of claim 1, wherein the content type metadata is searchable via structured query language type queries.

8. The method of claim 1, wherein the original data set is not parsed before storing in the data store.

9. The method of claim 1, wherein the one or more links in the document-based database used to access the content type metadata in the table-structured database and the original data set in the data store comprise one or more identifiers that correspond to data stored in the table-structured database and the data store.

10. The method of claim 1, wherein the original data set comprises biological data.

11. The method of claim 10, wherein the extracted header type metadata comprises one or more of: data identifying the particular mechanism used to obtain the biological data; data identifying the one or more biological species from which the biological data was taken; a file name of a data file in which the sequence of biological data is stored; and at least one of a creation data and a modification date of the data file.

12. The method of claim 10, wherein the extracted header type metadata comprises header information from a sequence alignment map file.

13. The method of claim 10, wherein the extracted content type metadata comprises one or more of: reads generated from the biological data; and variants generated from the biological data.

14. The method of claim 10, wherein the content type metadata comprises reference-aligned reads from a sequence alignment map file.

15. An article of manufacture comprising a processor-readable storage medium having encoded therein executable code of one or more software programs, wherein the one or more software programs when executed by one or more processing devices implement steps of:
obtaining at least one original data set;
extracting header type metadata from the original data set and storing the extracted header type metadata in a document-oriented database implemented on a first processing element, wherein the header type metadata comprises identifying data associated with the original data set;
extracting content type metadata from the original data set and storing the extracted content type metadata in a table-structured database implemented on a second processing element, wherein the content type metadata comprises one or more sets of data generated by analysis of the original data set, and wherein the first processing element is operatively coupled to the second processing element via a communication network;
storing the original data set in a data store implemented on a third processing device, wherein the first processing element and the second processing element are operatively coupled to the third processing element via the communication network;
wherein the document-oriented database comprises one or more links to access the content type metadata in the table-structured database and the original data set in the data store via the communication network operatively coupling the first processing element, the second processing element, and the third processing element;
receiving a query to access one or more of at least a portion of the original data set, at least a portion of the header type metadata, and at least a portion of the content type metadata; and
processing the query through the document-oriented database and accessing the content type metadata in the table-structured database and the original data set in the data store using the one or more links from the document-oriented database.

16. A data storage system comprising:
one or more processors operatively coupled to one or more memories and configured to:
obtain at least one original data set;
extract header type metadata from the original data set and storing the extracted header type metadata in a document-oriented database implemented on a first processing element, wherein the header type metadata comprises identifying data associated with the original data set;

extract content type metadata from the original data set and storing the extracted content type metadata in a table-structured database implemented on a second processing element, wherein the content type metadata comprises one or more sets of data generated by analysis of the original data set, and wherein the first processing element is operatively coupled to the second processing element via a communication network;

store the original data set in a data store implemented on a third processing device, wherein the first processing element and the second processing element are operatively coupled to the third processing element via the communication network;

wherein the document-oriented database comprises one or more links to access the content type metadata in the table-structured database and the original data set in the data store via the communication network operatively coupling the first processing element, the second processing element, and the third processing element;

receive a query to access one or more of at least a portion of the original data set, at least a portion of the header type metadata, and at least a portion of the content type metadata; and process the query through the document-oriented database and accessing the content type metadata in the table-structured database and the original data set in the data store using the one or more links from the document-oriented database.

17. The system of claim 16, wherein the one or more processors are further configured to perform one or more of the extracting steps using a parser configured to automatically determine a schema associated with the extracted metadata.

18. The system of claim 17, wherein the schema is automatically determined by the parser by at least one of: importing a schema; and applying a machine learning algorithm.

19. The system of claim 17, wherein the parser is configured to read data formats associated with the original data set, decompress metadata associated with the original data set, and separate the metadata into the header type metadata and the content type metadata.

20. The system of claim 16, wherein the original data set comprises biological data.

* * * * *